(12) United States Patent
Ivmark et al.

(10) Patent No.: US 9,170,778 B2
(45) Date of Patent: Oct. 27, 2015

(54) METHODS AND SYSTEMS FOR APPLICATION DEVELOPMENT

(75) Inventors: Allison T. Ivmark, San Francisco, CA (US); Ethan A. Eismann, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1253 days.

(21) Appl. No.: 12/420,468

(22) Filed: Apr. 8, 2009

(65) Prior Publication Data

US 2014/0250419 A1  Sep. 4, 2014

Related U.S. Application Data

(60) Provisional application No. 61/115,792, filed on Nov. 18, 2008.

(51) Int. Cl.
  *G06F 9/44* (2006.01)

(52) U.S. Cl.
  CPC .......................................... *G06F 8/20* (2013.01)

(58) Field of Classification Search
  CPC ................ G06F 21/6218; G06F 2221/2141; G06F 21/604; G06F 17/24; G06F 17/30165; G06F 11/3006
  USPC .................. 717/101, 113, 105, 109, 125; 715/700–866
  See application file for complete search history.

(56) References Cited

U.S. PATENT DOCUMENTS

| | | | |
|---|---|---|---|
| 5,799,295 A * | 8/1998 | Nagai | 706/46 |
| 5,872,974 A * | 2/1999 | Mezick | 717/109 |
| 6,185,577 B1 | 2/2001 | Nainani et al. | |
| 6,393,437 B1 | 5/2002 | Zinda et al. | |
| 6,560,648 B1 * | 5/2003 | Dunn et al. | 709/224 |
| 6,615,192 B1 | 9/2003 | Tagawa et al. | |
| 6,654,506 B1 | 11/2003 | Luo et al. | |
| 6,804,682 B1 | 10/2004 | Kemper et al. | |

(Continued)

OTHER PUBLICATIONS

Jessica Mantaro, "FrontPage 2003: The Missing Manual", Aug. 18, 2005, O'Reilly Media Inc., Pertinent Pages: All (cited: xiv, 10, 13-14, 18, 62, 156-158, 175-176, 183-184, 188, 192, 235, 237-241, 306-308, 346, 357, 359).*

(Continued)

*Primary Examiner* — Chat Do
*Assistant Examiner* — Sergio J Curbelo, III
(74) *Attorney, Agent, or Firm* — Kilpatrick Townsend & Stockton LLP

(57) ABSTRACT

Embodiments include a computer-readable medium embodying program code comprising code for receiving input defining a plurality of cells and a logical relationship between the cells, each cell representing a master screen of an application under development. Additional code for associating an asset with a cell, and code for storing a hyper-wireframe data structure identifying the plurality of cells, the logical relationship between the cells, and the asset may be included. The cells may be part of a hyper-wireframe embodied in a data structure alongside a plurality of assets and a target characteristic value of an intended target of the application under development. An application may determine whether to enable or disable an editing feature of an editing application based on the asset and the target characteristic value. Additionally or alternatively, permission data associated with assets may be used to enable or disable the editing feature.

28 Claims, 11 Drawing Sheets

(56) References Cited

U.S. PATENT DOCUMENTS

| | | | |
|---|---|---|---|
| 6,906,730 | B2 | 6/2005 | Bossut et al. |
| 6,940,526 | B2 | 9/2005 | Noda et al. |
| 7,091,974 | B2 | 8/2006 | Masera et al. |
| 7,133,050 | B2 | 11/2006 | Schowtka |
| 7,180,528 | B2 | 2/2007 | Bossut et al. |
| 7,246,307 | B2 * | 7/2007 | Arora et al. ............ 715/208 |
| 7,265,763 | B2 | 9/2007 | Bossut et al. |
| 7,386,834 | B2 | 6/2008 | Van De Vanter et al. |
| 7,454,706 | B1 * | 11/2008 | Matthews et al. ........ 715/713 |
| 7,503,012 | B2 | 3/2009 | Chen et al. |
| 7,503,034 | B2 | 3/2009 | Berg et al. |
| 7,506,342 | B2 | 3/2009 | Mousseau et al. |
| 7,530,079 | B2 | 5/2009 | Stubbs et al. |
| 7,644,390 | B2 | 1/2010 | Khodabandehloo et al. |
| 7,647,588 | B2 | 1/2010 | Cyphers |
| 7,675,528 | B2 | 3/2010 | Walker et al. |
| 7,683,916 | B2 | 3/2010 | Bossut et al. |
| 7,730,035 | B2 | 6/2010 | Berger et al. |
| 7,793,219 | B1 * | 9/2010 | Stratton et al. .......... 715/723 |
| 8,121,874 | B1 * | 2/2012 | Guheen et al. .......... 705/7.11 |
| 8,161,389 | B1 * | 4/2012 | Penner et al. ........... 715/731 |
| 2002/0111824 | A1 * | 8/2002 | Grainger ................. 705/1 |
| 2002/0116419 | A1 * | 8/2002 | Iyer et al. ............... 707/517 |
| 2002/0165883 | A1 | 11/2002 | Sans et al. |
| 2003/0200348 | A1 * | 10/2003 | Humphries ............. 709/310 |
| 2004/0205118 | A1 * | 10/2004 | Yu .......................... 709/203 |
| 2004/0257380 | A1 | 12/2004 | Herbert et al. |
| 2005/0044531 | A1 | 2/2005 | Chawla et al. |
| 2005/0057576 | A1 * | 3/2005 | Shen et al. .............. 345/619 |
| 2005/0160395 | A1 * | 7/2005 | Hughes ................... 717/102 |
| 2006/0069909 | A1 * | 3/2006 | Roth et al. .............. 713/100 |
| 2006/0149794 | A1 * | 7/2006 | Ylinen .................... 707/203 |
| 2006/0259386 | A1 * | 11/2006 | Knowlton et al. ...... 705/35 |
| 2006/0259981 | A1 * | 11/2006 | Ben-Shoshan .......... 726/27 |
| 2007/0043832 | A1 * | 2/2007 | Sane ........................ 709/219 |
| 2007/0101256 | A1 | 5/2007 | Simonyi |
| 2007/0118793 | A1 * | 5/2007 | Arora et al. ............. 715/501.1 |
| 2007/0169010 | A1 * | 7/2007 | Garner et al. ........... 717/136 |
| 2008/0091784 | A1 * | 4/2008 | Sundstrom .............. 709/206 |
| 2008/0163080 | A1 * | 7/2008 | Kooy et al. ............. 715/762 |
| 2009/0150761 | A1 * | 6/2009 | Sawicki et al. ......... 715/216 |

OTHER PUBLICATIONS

Matthew Moyer and Mustaque Ahamad, Generalized Role-Based Access Control, 2001, IEEE, pp. 391-398.*

Apache Subversion Features, available at http://subversion.apache.org/features.html (last accessed Nov. 2, 2010).

Subversion 1.5 Features, available at http://subversion.apache.org/docs/release-notes/1.5.html (last accessed Nov. 2, 2010).

Brambley, Unpublished U.S. Appl. No. 12/270,341, filed Nov. 13, 2008.

Butler, Unpublished U.S. Appl. No. 12/330,966, filed Dec. 9, 2008.

Adobe Systems Incorporated, "Adobe Device Central CS3 Mobilizes Creative Pros," Mar. 27, 2007.

Apple, Inc., "Working wih Xcode: Building Applications for the Future", published online; [retrieved on Jan. 3, 2012]; Retrieved from NPLs fo U.S. Appl. No. 11/470,863 (now PN. 7,530,079 B2), 2006, pp. 1-8.

Arm Limited, "Arm Developer Suite Version 1.2 CodeWarrier IDE Guide", published online; [retrieved on Jan. 3, 2012], Retrieved from Internet <URL:http://www.cis.gvsu.edu/-wolffe/courses/cs459/docs/ADS_CodeWarrierIDEGuide.pdf, 2001, pp. 1-464.

Gracia, et al., "A Double-Model Approach to Achieve Effective Model-View Separation in Template Based Web Applications", Springer-Verlag Berlin Heidelberg; [retrieved on Jan. 4, 2012]; Retrieved from Internet, <URL:http://www.yeastemplates.org/articles/JST-ICWE2007.pdf, 2007, pp. 442-456.

Szczur, "TAE Plus: Transportable Applicatins Environment Plus: A User Interface Development Environment", ACM, [retrieved on Jan. 3, 2012]; Retrieved from Internet <URL:http://dl.acm.org/citation.cfm?id=151509>, 1993, pp. 76-101.

Tanaka, et al., "Live Document Framework for Re-editing and Redistributing Contents in WWW", [retrieved on Jan. 5, 2012]; Retrieved from Internet <URL:http;l/km.meme.hokudai.ac.jp/people/itok/work/pdf/Tanakaltok-EJC-2002.pdf>, 2002, pp. 1-18.

Non Final Office Action in related U.S. Appl. No. 12/330,966 dated Jan. 18, 2012, 12 pages.

Final Office Action in related U.S. Appl. No. 12/270,341 dated May 8, 2012.

* cited by examiner

FIG. 4A

Dc
DEVICE CENTRAL CS PROFESSIONAL

| APPLICATION | MEDIA | PUBLICATION | MASTER PROFILE |

SELECT TARGET NETWORKS:

Carriers: US    405
Carriers: Europe
Carriers: Asia
Com Digital
Digital Digi Com
DirectSatelite
TMe
HDSatelite
Other...

TARGET PLATFORMS:

- Mobile
- Desktop
- HDTV

409

406

BACK    NEXT

FIND TEMPLATES...
🔍 SEARCH 402
408

*FIG. 4B*

METHODS AND SYSTEMS FOR APPLICATION DEVELOPMENT

CROSS-REFERENCE TO RELATED APPLICATION AND PRIORITY CLAIM

This application claims priority to U.S. Patent Application No. 61/115,792, filed Nov. 18, 2008 and titled "Methods and Systems for Multi-Target Application Development," which is incorporated by reference herein in its entirety.

TECHNICAL FIELD

The disclosure below generally relates to development of software, including, but not limited to, development of designs and applications using a common asset base and intended for distribution to multiple targets.

BACKGROUND

When software is developed, it is not unusual for more time to be spent determining how to implement the software than is spent actually implementing the software. For instance, to develop an application, use cases, objectives, and specific requirements may be determined for one or more distinct platforms. Then, modeling, flowcharts, wireframes, and mock-ups are developed. Mockups can be verified against objectives and platform requirements before implementation finally begins. In the midst of this activity, documentation for the project is developed, which may be a formidable task in and of itself due to last-minute changes in implementation.

Such challenges may be multiplied when a project is intended to develop one application for multiple "targets," i.e. for multiple different devices, platforms, embedded hardware systems, operating systems, or otherwise for implementation with different enabling applications or execution environments.

SUMMARY

Embodiments include a computer-readable medium embodying program code for receiving input defining a plurality of cells and a logical relationship between the cells, each cell representing a master screen of an application under development. Additional code for associating an asset with a cell, and code for storing a hyper-wireframe data structure identifying the plurality of cells, the logical relationship between the cells, and the asset (or a link or other reference to the asset) may be included. The cells may be part of a hyper-wireframe embodied in a data structure alongside a plurality of assets (or references thereto) and a target characteristic value of an intended target of the application under development. An application may determine whether to enable or disable an editing feature of an editing application based on the asset and the target characteristic value. Additionally or alternatively, permission data associated with assets may be used to enable or disable the editing feature.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments through use of the teachings herein.

BRIEF DESCRIPTION OF THE DRAWINGS

A full and enabling disclosure is set forth more particularly in the remainder of the specification. The specification makes reference to the following appended figures:

FIGS. 4A-4B illustrate user interfaces for defining a master profile.

DETAILED DESCRIPTION

Figure 1:
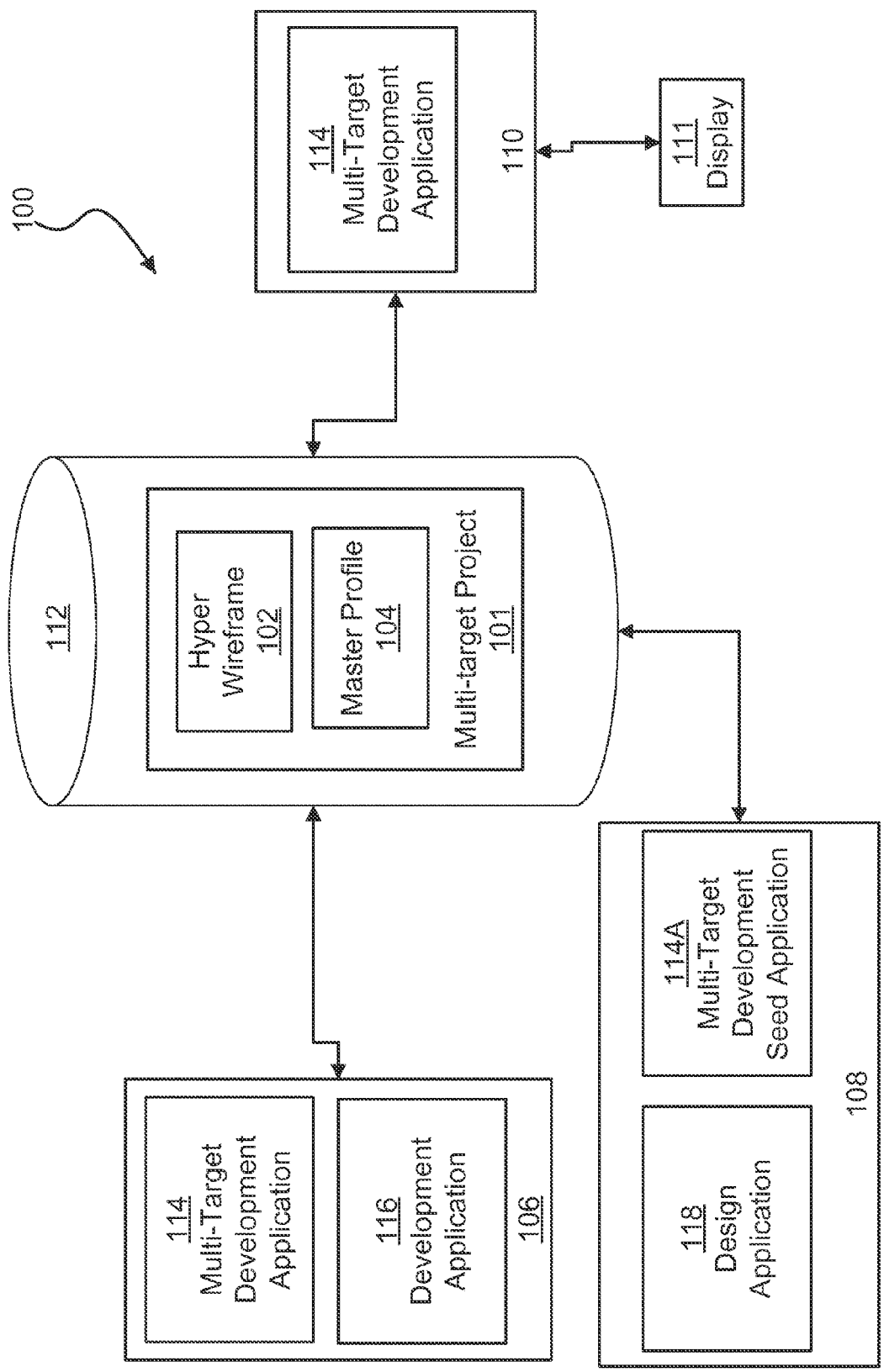
FIG. 1 is a block diagram illustrating an exemplary development system using a multi-target development application.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of methods and systems for multitarget application development. However, it will be understood by those skilled in the art that embodiments of the present subject matter may be practiced without these specific details. In other instances, methods, apparatuses or systems that would be known by one of ordinary skill have not been described in detail so as not to obscure the present subject matter.

In some embodiments, a development application may provide what is referred to herein as a "hyper-wireframe" to integrate architecture-level planning tasks for a project with design and coding tasks and therefore allow for more efficient management, implementation, and oversight of the project. The hyper-wireframe can be used to manage the project and usage of its assets, such as artwork, code, documentation, and annotations by providing data structure that captures the organizational relationship of the application under development both from a development standpoint and an implementation standpoint, along with identifying particular assets of the application under development. The assets may be identified by references (e.g., links, file locations) stored in the hyper-wireframe and/or may be stored in the hyperwireframe itself.

For instance, in some embodiments, the organizational relationship from an implementation standpoint can be indicated by data identifying a plurality of cells or other logical units that represent a skeleton for an application. For example, the cells may comprise different master screens or states of the application arranged into levels or another suitable navigational architecture representing the intended end-user experience for the application. In some embodiments, a hyper-wireframe may specify a welcome screen and then several top-level screens of an application, with each top-level screen linked to additional screens.

From a development standpoint, the hyper-wireframe can allow team members to access, and in some cases edit or specify, assets for use in constructing the project. Some assets may be identified in the hyperwireframe as associated with respective screens, states, or other logical units of the application, while some assets are applicable to the entire application or to several screens, states, or logical units. For example, the data structure may associate assets such as artwork files, code segments, documentation files, and other data to particular cells, with the assets to be used in producing one or more output files constituting the project. As another example, the data structure may include assets to be used indirectly by developers in completing the project, such as mockups, development notes, and testing information.

In certain embodiments, a multi-target data structure may be defined. As an example, an application may be developed for use on different platforms, such as for use on a cellular telephone, desktop computer, and television. The multi-target data structure can allow for management of common assets and target-specific assets in light of profile information for each of the development targets of a multi-target project. For example, particular platforms may require specialized formats or versions of graphics not used by other platforms. The multi-target data structure can identify assets, parameters, and other items specific to implementation for one or more particular targets of the project. As will be noted in further detail below, a "target" is meant to refer to a particular implementation use scenario for the application being developed, and may refer to different hardware platforms, software platforms (i.e. operating systems or execution environments), communication protocols, and combinations thereof, for example.

For example, in one project, a first target may comprise a cellular telephone model for a particular network, another, a second target may comprise the same model device but for a different network, a third target may comprise high-definition televisions (HDTV) generally, and a fourth target may comprise a hardware-independent software execution environment (such as, for example, ADOBE® AIR®).

In some embodiments, a "master profile" can be defined for a particular project to set forth the characteristics of specified targets for which the project will be implemented. For example, a plurality of target profiles may be specified and analyzed to determine a "least common denominator" regarding target characteristics such as visual/audio capabilities, network type (e.g., 3G, GSM, CDMA), input capabilities, frequency/bandwidth and other factors for which an application for the target platform may need to be optimized.

However, in specifying a master profile, a user can designate priorities among certain targets, and so development tasks may not necessarily be focused on the least common denominator for particular target scenarios. For instance, if a low-priority target has a lower frame rate than the remainder of the targets, then the lower frame rate of the low-priority target may not be the default preset.

The master profile data can be provided to a development team to communicate which aspects of the target platforms will require departure from the baseline application. For example, in some embodiments, the master profile data can be used to simulate output for particular master screens as such screens will appear on target platforms and/or to adjust display, editing, or other features of editing applications.

In some embodiments, a data structure comprising assets can include permission data, such as permissions for certain users or certain project roles (e.g., manager, designer, developer, third-party content provider). The permission data can be used to control how assets are handled by different applications. For instance, assets related to art designs may be made accessible but not editable to software engineers responsible for writing code. As another example, the permission data may define viewing and editing rights to the data structure itself.

Embodiments include methods and systems that utilize a data structure including the aspects noted above in one or more combinations. For example, a hyper wireframe data structure may include permission data for assets and/or for certain logical units (e.g. cells) of the project. As another example, a multi-target data structure may include permission data for assets and/or for certain targets. Still further, a hyper wireframe data structure may include both permission data and multi-target information.

FIG. 1 is a block diagram showing an exemplary development system 100. A multi-target project 101 can be defined based on a hyper-wireframe 102 master profile 104 and published for use by a development team as shown in FIG. 1. In this example, a plurality of computing platforms 106, 108, and 110 are used by different members of a development team by access to data store or memory 112 that houses or embodies the files/data structures comprising the project. For example, data store 112 may be provided by a server accessible by a wide-area and/or local-area connection. In this example, each development team member computing platform 106, 108, 110 executes an embodiment of a multi-target development application 114/114A, although the application could be executed from a common source. For instance, development application 114 may itself comprise a network application available from a server A multi-target development application 114 may be a stand-alone application in some embodiments as shown in use on platforms 106 and 110. However, in other embodiments, a multi-target development application is a seed application that interacts with one or more editing applications that can be used to author or edit one or more assets. For example, one or more editing applications may configure a general purpose computing apparatus into an apparatus for authoring or editing content.

For example, the seed application may be accessible by other applications in a suite of editing applications comprising design and development applications that are used by various team members. An example of this is shown at 114A on platform 108.

Examples of development applications include ADOBE® FLEX BUILDER CS4 and ADOBE® DREAMWEAVER®, and examples of design applications include ADOBE® PHOTOSHOP®, ADOBE® FIREWORKS®, and ADOBE ILLUSTRATOR®, which are all available from Adobe Systems Inc. of San Jose, Calif.

A seed application can be used to translate multi-target project data 101 into a form as needed for consumption by or control of a design, development, or other editing application to the extent that the data is not maintained in such a form. For example, seed application 114A may allow design application 118 to identify portions of hyper-wireframe 102 and/or assets defined therein that are editable by design application 118 (e.g., which portions are artwork and which portions are code). Further, seed application 114A may provide commands to design application 118 or otherwise restrict or enhance the functionality of design application 118 based on user permissions and/or target characteristic values set forth in hyper-wireframe 102 and/or master profile 104.

A standalone version of multi-target development application may support providing such commands to a design or development application, or may leverage the design or development application to provide editing capabilities within the multi-target development application. As another example, an editing application may be configured to natively recognize data structures comprising hyper-wireframe and/or multi-target data.

Regardless of the particular implementation, multi-target development application 114 can be used to coordinate different aspects of the project. For example, each instance of application 114/114A can access hyper-wireframe 102, master profile 104, and other data of multi-target project 101.

In some embodiments, hyper-wireframe 102 and/or master profile 104 defines permissions for different aspects of the project. For example, computing platform 110 may represent a project manager computer operated by a user with full administrator rights and full authority to alter any aspect of the project. Computing platform 106 may represent a device used by a developer (as shown by use of development application 116) to code portions of the project, while computing platform 108 may be a device used by a designer (as shown by use of design application 118) to work on visual elements of the project.

Permissions can be used to restrict users based on their respective roles. For example, a developer may be allowed read access for graphical elements of the project and write access only to those portions of the project for which the developer is responsible. For instance, a developer may be responsible for coding a certain portion of the project, such as implementing effects for user interface assets. The developer may be prevented from making edits to skins and artwork used to render the interface assets and from making edits to other portions of the code (e.g., code for accessing data sources). Similarly, a designer may be permitted to adjust visual elements of the application, but may be locked out of edits to code assets. Both the developer and designer may be prevented from making changes to the overall wireframe or other architectural/navigational aspects of the project.

Figure 2:
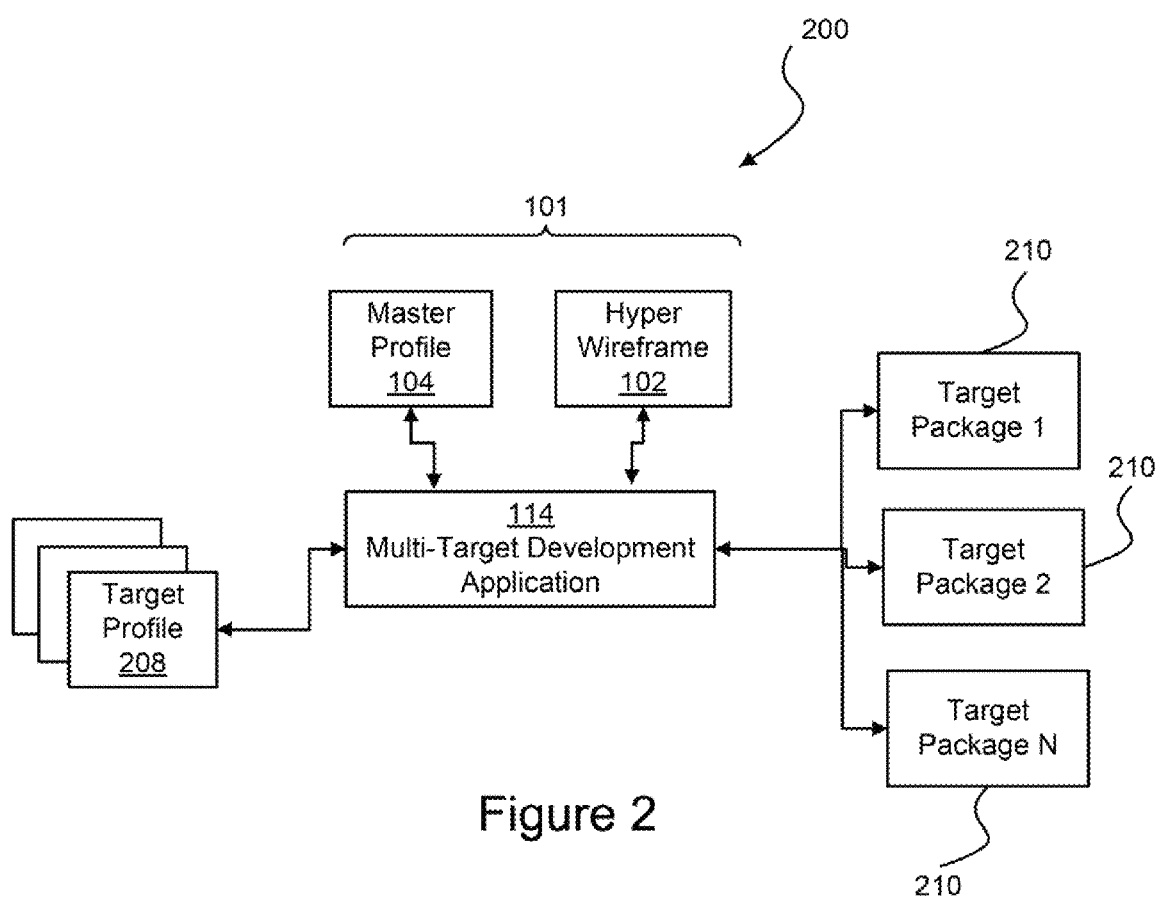
FIG. 2 illustrates an example of inputs and outputs in an exemplary workflow using a multi-target development application.

FIG. 2 is a block diagram illustrating a development system 200 configured in accordance with aspects of the present subject matter. A multi target development application 114 is used to manage development of, and in some embodiments, can be used to provide, a plurality of target packages 210 ("target package 1", "target package 2", and "target package N" in this example). Development application 114 can be used to define a multi-target project 101 in terms of a hyper-wireframe 102 and a master profile 104 that is assembled based on one or more target profiles 208. Target packages 210 can be provided based on the multi-target project 101, and can each comprise one or more applications, processes, or other assets that were developed for the project. For ease of explanation, the end result of the project is referred to as an application in the examples below. However, a target package may also include supporting files and documentation in some embodiments. Additionally, the term application is not meant to be limiting-for example, the end product may be a plurality of applications or program components to be used alongside other program components.

Although the end result of a multi-target development project can comprise one or more applications, some embodiments of multi-target development application 114 do not provide application code (such as, for example, executable code) automatically. For instance, a multi-target development application may be used to define and manage a project via a hyper-wireframe but with conventional tools used to develop and compile source code. To the extent application code is not generated automatically when a package is exported, the package may include target-specific graphic elements and assets along with source code to be manually optimized and compiled as needed for the specific target platform.

As noted above, a target can refer to a particular implementation scenario. Target profiles are used by the multi-target development application to define a baseline to be met in implementing the project for different targets. Targets may comprise classes of devices, such as mobile phones, personal or laptop computers, televisions, and the like. However, targets may be defined in broader or narrower terms.

For example, different targets can comprise different devices or device models, such as specific cellular telephones or other mobile devices, specific computer platforms, or specific television types (e.g., HDTV, standard TV, etc.). As another example, another "target" may comprise a particular network type (e.g. CDMA, GSM) or specific communication networks (e.g., a specific satellite provider, a specific cellular or other network) such as particular cellular or other communication providers. Another example of multiple targets is when different application versions are to be provided for different execution environments, such as when an version of an application is intended for execution as a browser plug-in or in a specified execution environment (e.g. ADOBE® AIR™, ADOBE® FLASH® available from Adobe Systems Inc. of San Jose, Calif.) and when another version is intended for execution in a different context (e.g. as a stand-alone application executed using an operating system).

The target profiles 208 can set forth target characteristic values that best leverage the capabilities and/or identify limitations of device(s), platform(s), network(s) or other system components that will execute target-specific variants of the application being developed. Target profiles 208 may, for example, be available from an original equipment manufacturer (OEM) or may be defined in a standard language by another provider. For example, different devices may support different bit depths, alpha transparencies, audio availability, different pixel ratios, different pixel densities, and different frame rates. Different networks may support different data rates and latencies. Of course, different operating systems may have different requirements for implementing program components. These and other values can be included in the target profile of the respective devices. A target characteristic value may be numerical or may take another form such as a string or binary value, for example.

Despite numerous potential differences, a more efficient design process can generally rely on a "safe zone" for designing around common capabilities of the various target platforms. Then, particular aspects of the baseline application can be adjusted to work around relative deficiencies or take advantage of particular enhancements of the different platforms. For example, a lowest common value for each target characteristic as between a plurality of targets can be determined by algorithmically reconciling or calculating the lowest common value. For example, numerical values (e.g., resolution) can be analyzed to determine the lowest value, while discrete values (e.g., mono/stereo, browser language support, closed-captioning types) can be evaluated by rules (e.g., "mono" is lower than "stereo", etc.).

The baseline application can be developed using the highest-quality components possible (e.g., highest resolution, stereo UI sounds), and then the target packages compressed accordingly based on individual limitations of the targets. As an alternative, the lowest-quality could be controlling if no compression step is to be taken, but some target capabilities may be underutilized.

However, rather than defining a lowest common denominator for development purposes across all potential platforms, the actual characteristics of the various intended targets for the project can be considered. For example, if all targets of interest for a particular project are capable of high frame rates, then an artificially low framerate of a non-target need not constrain the design of the project.

In some embodiments, target profiles 208 are selected for use in determining a master profile 104 which is used to clearly indicate commonalities and disparities of the different target platforms. For example, master profile 104 can be used to determine global and local settings for developers to use in writing code, for designers to use in producing art and other designs, and/or may be used for automated generation of source code or other components. As another example, different targets may have different input capabilities-for instance, some mobile phones may support input via a 5-way keypad while others support a touchscreen. As a further example, different targets may have specific memory and/or CPU capabilities that should be considered in optimizing an application. For example, a mobile device may rely on non-volatile memory while a desktop computer may have access to RAM and/or cache memory.

The master profile may allow for layering of target profiles. For example, a particular device model may have significantly different performance characteristics when used on a first network as compared to when the device is used on a second network. For instance, a device capable of high data rates may not be able to use its full capability when used on a network with lower bandwidth or where a network provider throttles the data rate. Thus, it may be desirable for applications intended for the device to consider its true data rate in light of the network for which the device is used.

The master profile may allow for priority levels for different targets. For instance, a project may be developed for several different mobile devices with varying capabilities. If a highly-capable device is the primary target, then the master profile settings can be set to reflect the capabilities of the primary target rather than the capabilities of the lowest common denominator of the group.

Target characteristic values for a particular project can be maintained in master profile 104 for reference by multi-target development application 114 in handling a particular multi-target project 101. The master profile may include only the target characteristic values determined for use in the project. However, in some embodiments, the master profile can comprise the source target profiles for reference during the development process. For instance, the master profile may include global settings comprising target characteristic values applicable to all targets and one or more levels of specificity with target characteristic values for particular targets (or groups of targets).

Hyper-wireframe 102 can be used to develop an overall architecture for the project and specify links to design aspects (such as, for example, skins and artwork assets), development aspects (such as, for example, assets such as functional components, source code segments), documentation aspects, and can provide navigation options for viewing and specifying particular variants of portions of the baseline application for specific target platforms. In some embodiments, hyper-wireframe 102 includes the actual data representing the various assets of the project.

In some embodiments, a hyper-wireframe provides a navigational/architectural view of an application by depicting the application as a series of master screens linked by connectors. The connectors can represent transitions between master screens, such as navigational options or other changes in the interface of the application as program flow proceeds so that the intended end-user experience is represented. For example, each master screen can be depicted as a cell in a diagram as shown later below in FIGS. 6A, 6B, and 7.

Hyper-wireframe 102 is shown as a separate component in FIGS. 1-2. However, the hyper-wireframe 102 may itself be integrated into the file(s) defining multi-target project 101 along with master profile 104 by way of a particular file structure. For example, a cross-application file structure can be used so that different applications can access multi-target project 101 and identify different assets with reference to the project architecture defined by hyper-wireframe 102. For example, XML or another structured file format can be used to identify which portions of multi-target project 101 relate to the master profile 104 (and accordingly include target platform characteristics) and which portions of multi-target project 101 relate to application components (such as which portions relate to artwork and which application states the artwork relates to) and how the application components are arranged into the overall navigational/structural architecture set forth in the wireframe.

For example, a portion of multi-target project may be tagged with appropriate identifiers to indicate that artwork assets belong to a particular master screen and are associated with particular functional components (e.g. buttons, sliders, etc.). A design application may access multi-target project 101 and display different master screens as different layers to allow a designer to edit the appropriate layers. A development application may access multi-target project 101 and provide different windows or data entry interfaces for editing functional components such as code corresponding to master screens. Based on hyper-wireframe data included in multi-target project 101, the design and/or development application can indicate how the particular cell will appear (or be represented in code) for the different target(s).

Multi-target development application 114 may itself provide development capability in addition to defining master profiles and an overall architecture for a project. In some embodiments, a multi-target development application can support partial or fully automatic generation of code for different target platforms based on a unified code base referenced in a hyper-wireframe 102. As used herein, a unified code base is meant to refer to cross-platform/cross-target persistent and/or universal code. For instance, some embodiments support generalized code that can be adapted to platform-specific code and/or compiled into platform-specific executed code.

As another example, multi-target development application 114 may provide a preview of user interface (UI) components for different target platforms so that a designer can view different screens of an application as the screens will appear in different targets. This preview capability may comprise static mockups in some embodiments. However, multi-target development application 114 may support partially or fully interactive views of the application or assets thereof as implemented for different target platforms as filtered by the target characteristic values for the overall project and for the different platforms.

In some embodiments, multi-target development application 114 provides side-by-side comparison capability for multiple variants of master screens within other applications used to generate and edit assets. Such applications are referred to generally as editing applications herein. For example, a design application used to edit artwork assets may rely on development application 114 to provide a side-by-side comparison of different variants of a master screen using the artwork as the artwork is edited. This may allow the designer to view the results of the edit in light of the capabilities and limitations of the target platforms. For instance, if one target platform does not support graphic effects such as gradients, then the designer can see how a gradient effect will appear on that platform and make appropriate adjustments.

In the examples presented above in conjunction with FIGS. 1 and 2, a hyper-wireframe was used in the context of a multi-target project. However, the same principles for development and use of hyper-wireframe 102 could be applied in the context of a single-target project. As an example, a single target profile could be used to define particular characteristics of the target. However, in some embodiments, the project could proceed with no target information at all and utilize only the hyper-wireframing aspects of the present subject matter. Thus, although application 114 is referred to as a "multi-target development application," it could be used in instances where there is only a single target, and in some embodiments need not support multi-target capabilities.

As another example, the multi-target aspects of the example above could be applied without the use of hyper-wireframe 102. For instance, a multi-target project document type could be utilized, with the multi-target project document type defining a data structure that identifies assets, either by reference such as a link or by including the actual assets, and associates assets with target characteristic values. In such embodiments, the multi-target project document type may not include data identifying the navigational flow or other logical structure indicating the intended end-user experience, but instead may simply identify target characteristic values and groups of different assets for the different intended targets of the project.

Even in embodiments without the hyper-wireframe data, the multi-target project document type may nonetheless include permissions data to restrict access and editing of assets and the multi-target project data structure itself. Seed and/or other applications could be used to support the multi-target aspects without reference to hyper-wireframes. Instead, a standalone library source could be used for reference to assets.

Figure 3:
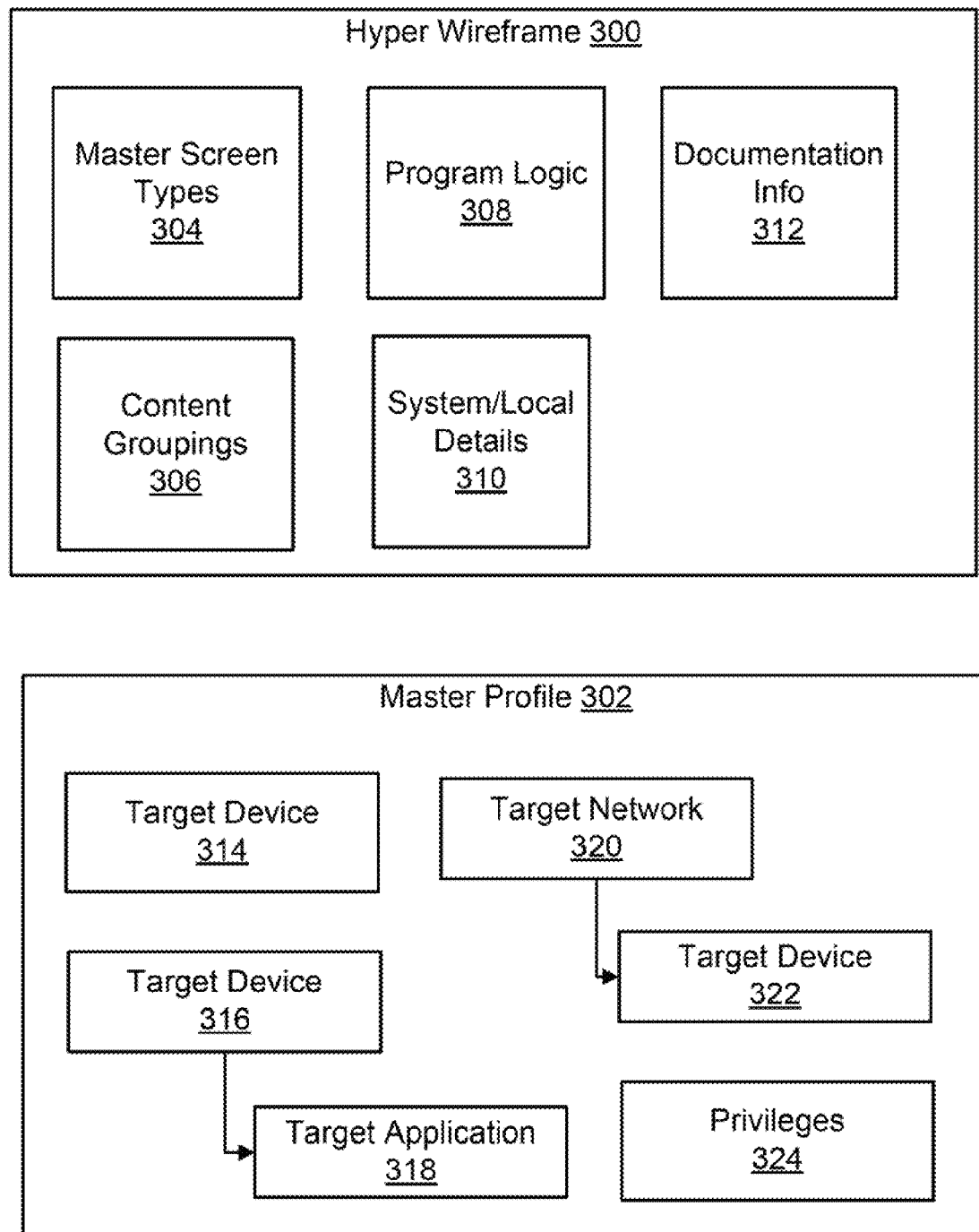
FIG. 3 is a block diagram illustrating exemplary data components of a hyper-wireframe and a master profile.

FIG. 3 provides an example of a hyper-wireframe 300 and a master profile 302. Hyper-wireframe 300 includes data defining different screen types or states 304, content groupings 306 for displaying content by the baseline application under development, program logic 308, system and localized detail data 310, and documentation information 312. Generally, a hyper-wireframe provides containers for different logical portions of a project while also expressing an organizational structure reflecting the intended end-user experience for the resulting application.

The level of detail in the wireframe can vary. For example, screen type data 304 may include detailed mockups of different screens for the application under development. The screens may be indicated as artwork files or may be indicated as collections of artwork files. Content groupings 306 may include several nested layers with appropriate cross-references to data sources for use in implementing the screens. Program logic 308 may represent simple flowcharts illustrating a basic sketch of the application or may comprise detailed diagrams (e.g. flowcharts, unified modeling language (UML) diagrams) depicting how the application components are to be implemented.

System and localization detail data 310 may include specific adjustments to be made to the baseline application for different targets, if hyper-wireframe 300 is used for a multi-target project. For example, if particular display characteristics such as frame rate and alpha transparency are to be adjusted downward (or upward) for a particular target, data identifying the target and adjustment may be included in localization detail data 310.

Documentation information 312 can comprise data to be used in generating documentation for the project when target packages are provided. For example, documentation text and graphics may be set forth in the hyper-wireframe and/or links or other locators can be specified for reference to outside data. In some embodiments, documentation information 312 can be used to automatically generate documentation for a project, such as when a project is completed or when a build is released for testing.

Documentation information 312 may also include project-specific data not intended to be directly used in the application. For example, the hyper-wireframe may support feedback such as messages associated with particular components, screens, or other aspects. For instance, a project team member or client reviewing the work-in-progress may generate a note indicating a desired change to artwork or another asset and the note may be associated with the asset in the hyper-wireframe data structure. As another example, contracts or contact information for clients, third-party developers, or other parties involved with the project may be maintained for easy reference in administering the project.

The hyper-wireframe may also include annotations, such as metadata for different assets and the project itself. The annotations may also include comments and instructions for different assets or the project, such as messages containing questions from managers or third-party content providers.

Below, a small excerpt of exemplary hyper-wireframe data is presented in textual form. Some embodiments may support export of the hyper-wireframe data in a textual or human-readable format, although this feature is not required.

In this example, the application under development includes a welcome screen and a "best of show" screen for video previews and includes data for one target platform ("variant a") that utilizes different assets for the "best of show" since the platform does not support video thumbnails (namely, the 'code asset' video preview is not included at all and the source is modified to display static thumbnails). The hyper-wireframe also has permissions data for three users.

```
<Project>
<Master Screens>
<Welcome Master Screen>
<assets>
art asset = background.jpg;
code asset = welcome source code.xml
code asset = tab interface.xml
</assets>
<annotations>
comment from Bob.txt
</annotations>
</Welcome Master Screen>
<BestofShow_Screen>
art asset = background.jpg
code asset = best_of_show source.xml
code asset = tab interface.xml
code asset = video_preview_widget.mxml
</ BestofShow_Screen >
< BestofShow_Screen variant A>
art asset = background.jpg
code asset = best_of_show_source_static_thumbs.xml
code asset = tab interface.xml
</ BestofShow_Screen variant A>
</Master Screens>
<Permissions>
Bob: Administrator
Lucy: Art Read-Write
George: Code Read-Write: Art Read-Only;
```

-continued

```
    </Permissions>
  </Project>
```

Master profile 302 includes items of data for a plurality of targets. In this example data is included for a target device 314, a target device 316 and a particular target application 318, such as a specific browser. Additionally, master profile 302 specifies a target network 320 such as a cellular provider of interest and a target device 322 for that network. As noted above, master profile 302 includes permissions data 324 specifying which portions of the project are accessible and/or editable by certain users or classes of users. For a single-target project, master profile 302 may include data for the single target or may not be used at all. Although permissions data 324 is shown in conjunction with master profile 302, hyper-wireframe 300 may additionally or alternatively include permissions data 324.

Figure 4A:
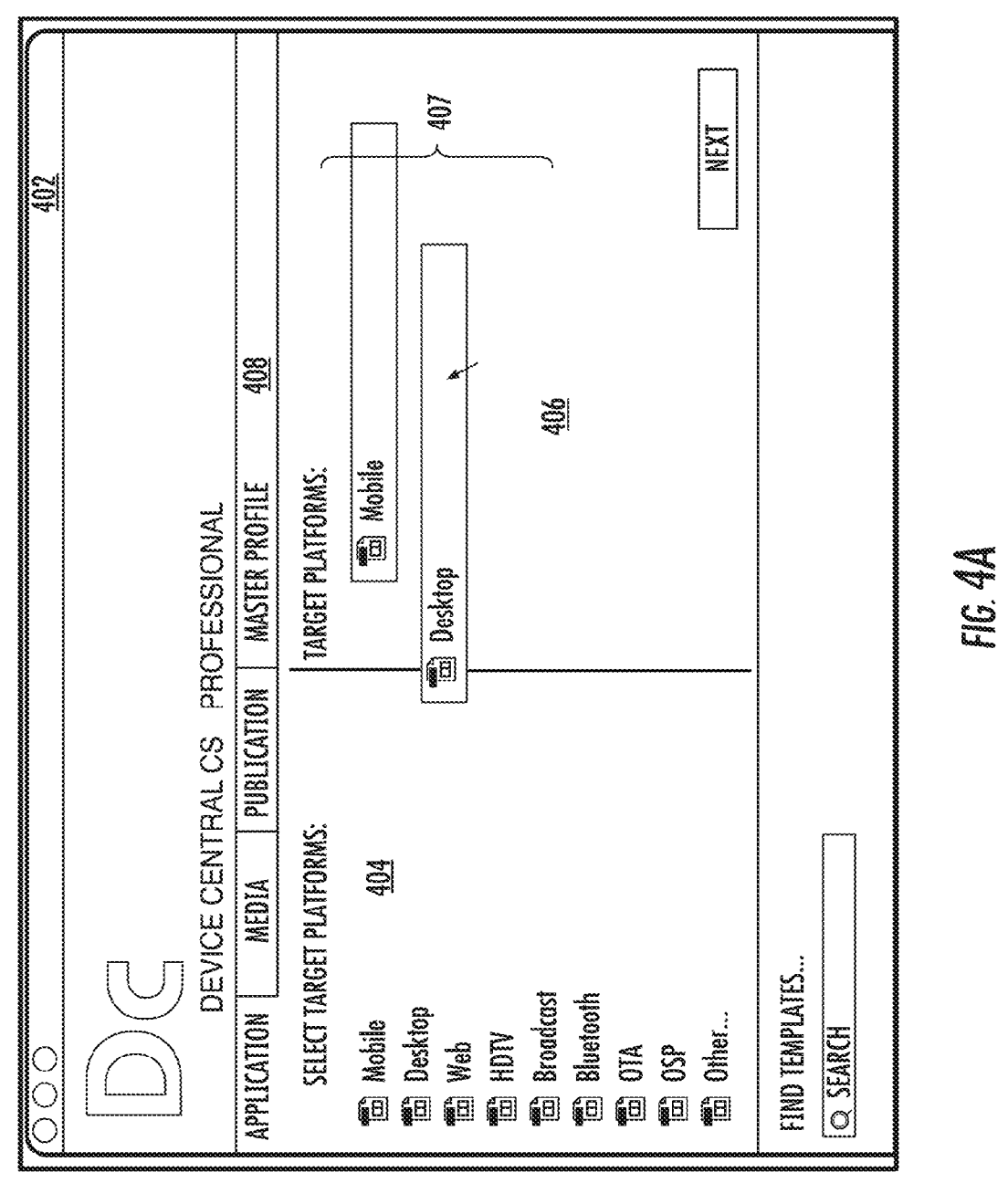

With the above discussion of exemplary implementation architecture in mind, the specification now turns to more particular examples of workflow using an exemplary multi-target development application. FIGS. 4A and 4B illustrate an exemplary user interface 402 for defining a master profile. User interface 402 in this example comprises a tabbed menu 408. In this example, an "application" tab 404 is selected to allow a user to drag and drop various categories of target platforms into a target platform designation area 406. As shown in FIG. 4A, a user is dragging a general category "desktop" into a collection 407 of target platforms that already includes "mobile."

In FIG. 4B, a collection of target platforms 409 has been assembled to include "Mobile," "Desktop," and "HDTV." Target selection area 405 has been rendered to allow a user to drill down to one or more particular target networks of interest. In this example, target networks include various fictional cellular telephone carriers, cable TV providers, satellite providers, and other services for data transmission.

Figure 5:
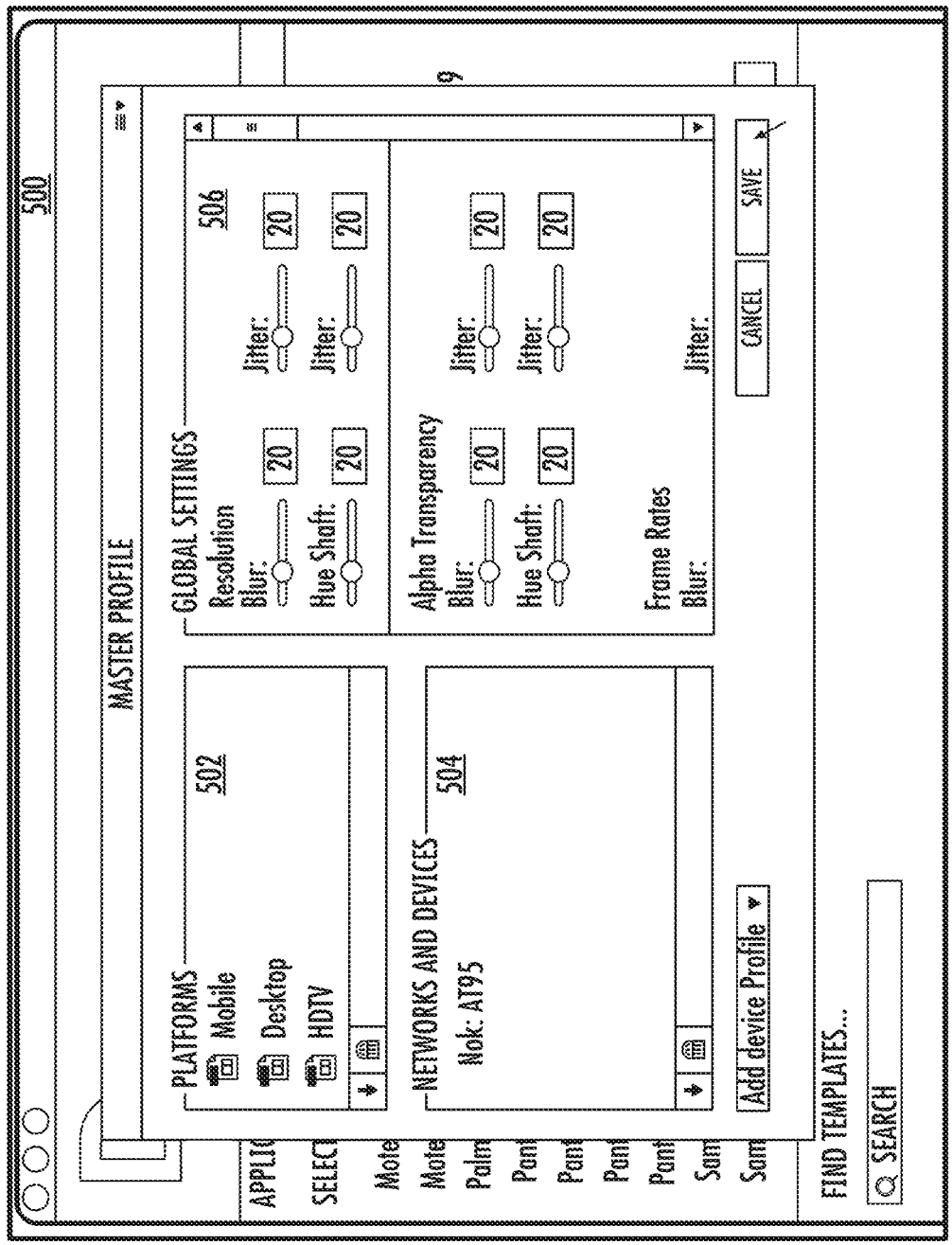
FIG. 5 illustrates a user interface for adjusting master profile parameters.

FIG. 5 illustrates a user interface 500 indicating some of the parameters of a resulting master profile. In this example, user interface 500 includes a platform listing 502 indicating that this master profile includes mobile, desktop, and HDTV platforms. As shown at 504, the user has selected the "Nok" network and a particular device ("AT95").

Global settings are indicated at 506. In this example, based on target profile information for the selected platforms, global settings for resolution, alpha transparency, frame rates, and other parameters have been generated. A user can adjust the settings accordingly to fine-tune parameters to suit the particular project's needs. For example, if the most important target platform for a particular project supports a higher frame rate, then the baseline frame rate can be adjusted upward. In some embodiments, a user may indicate relative priority of different target platforms, and the baseline characteristics can be adjusted upward or downward to ensure that the global settings meet the requirements or take advantage of the capabilities of the high-priority target platform(s).

Figure 6A:
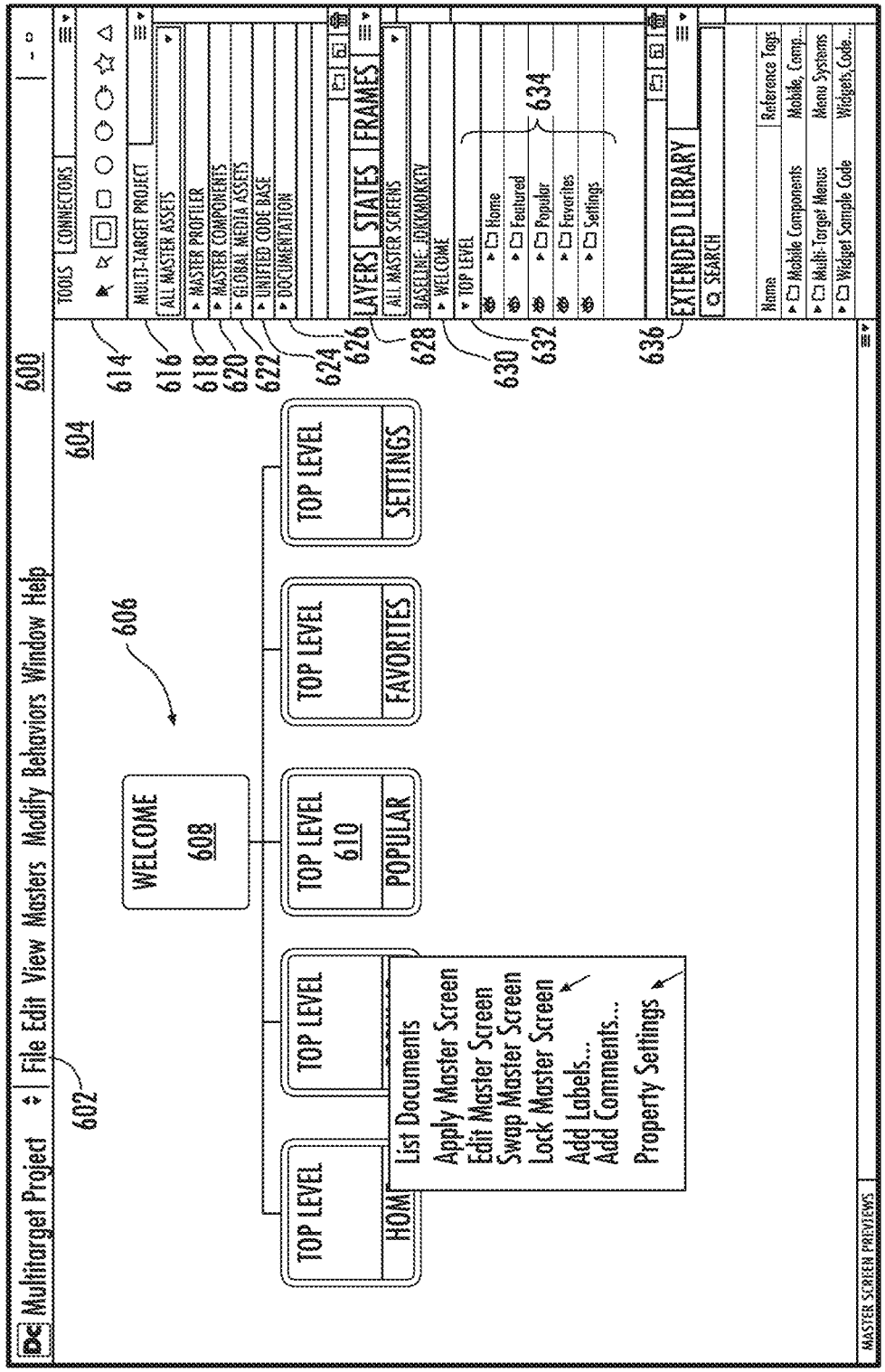
FIGS. 6A-6B illustrate a user interface for editing a hyper-wireframe and linked assets of a development project.

FIG. 6A depicts a user interface 600 for use in defining aspects of a multi-target project by using a hyper-wireframe. In this example, user interface 600 includes a menu bar 602, work area 604, and a plurality of tools and palettes illustrated at 614. Work area 604 includes a view of a hyper-wireframe 606. For example, a multi-target project can be defined based on a master profile. As was noted above, data defining the project can be structured or indexed via a hyper-wireframe that indicates an overall architecture for the project indicating the relationship between the master screens.

Figure 6B:
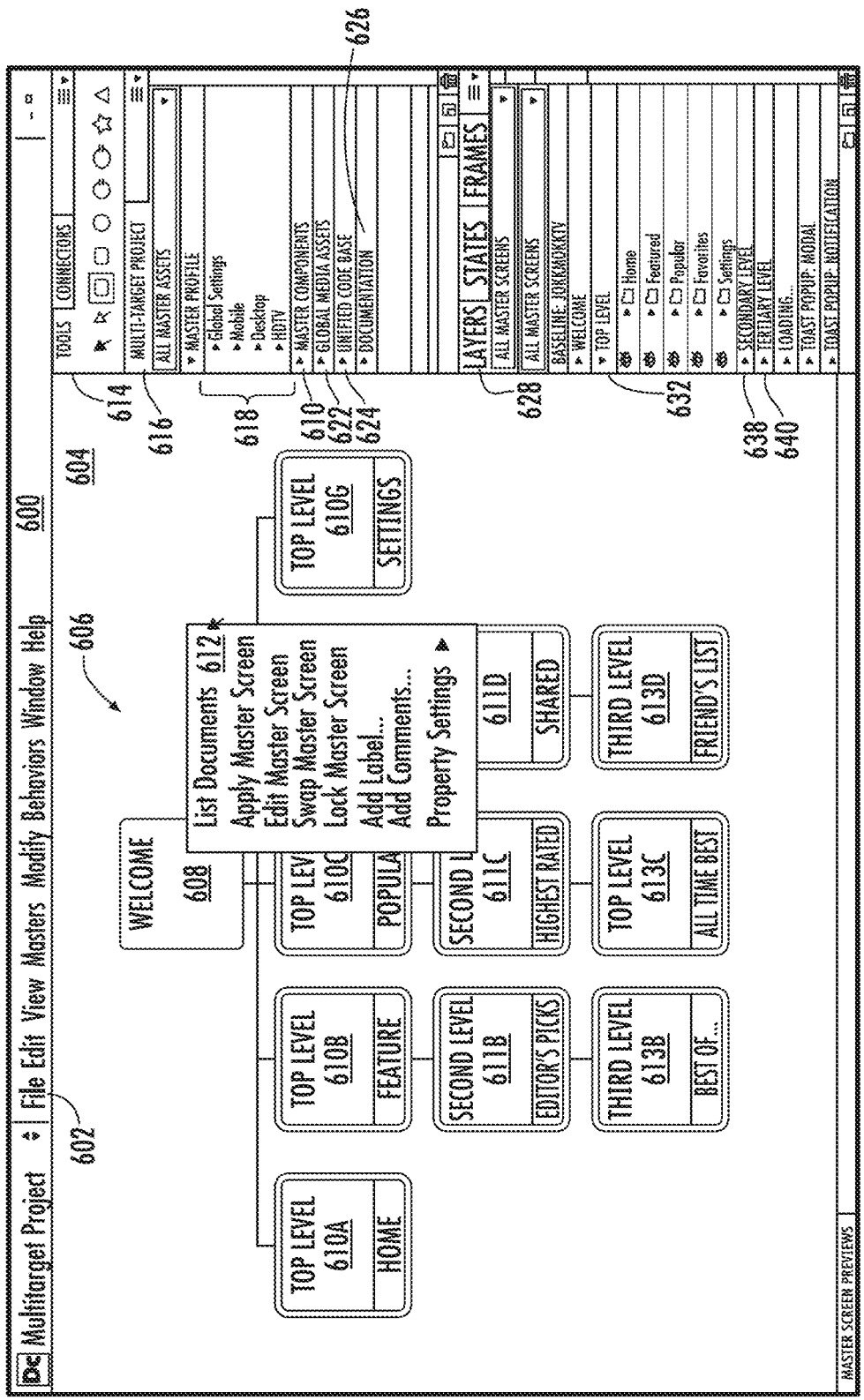

In this example, hyper-wireframe 604 includes a plurality of cells 608 and 610. Each cell may represent a different master component, such as a screen or state of the application being developed. These master components are referred to as master screens herein. For instance, as depicted in FIG. 6B, a single cell 608 is shown for a "welcome" screen while a plurality of "top level" cells 610A, 610B, 610C, 610D, and 610E are shown respectively illustrating a "Home," "Feature," "Popular," "Favorites," and "Settings" screen. Each "top level" screen may, for example, correspond to a different state wherein the application provides different functionality. For example, the "welcome" screen may be the hub for navigating to the remaining screens that allow a user to view a featured media item, a list of popular media items, adjusting settings, and the like. Thus, the intended logical flow to be experienced by an end user of the application under development can be defined.

In this example, a menu 612 is provided with the "Lock Master Screen" command selected. As was noted above, a hyper-wireframe or master profile data structure may provide for permissions or other control settings to allow or disallow certain types of edits by different users. For example, an administrator user may define the parameters of the "home" screen or the overall architecture and then lock in those parameters for the project to prevent changes by other team members in the course of work on the project. Different levels of access may be provided-for example, an administrator may preclude all access irrespective of privilege level or specify conditions for certain types of read and/or write access.

FIG. 6 illustrates several additional menus for navigating components and settings for the multi-target project. For example, the multi-target project tab 616 features a plurality of drawers 618, 620, 622, 624, and 626. Each drawer may be used to specify particular portions of the project for viewing and editing if the user has sufficient permissions. The drawers can be used to indicate application-wide information (such as profile data) and portions specific to different master components. For example, master profiler 618 may allow access to profile data on a global level and for specific target platforms for the project. Master components drawer 620 can allow a user to specify functional components such as code segments for use in implementing aspects of one or more cells of hyper-wireframe 606 such as navigational menus, "widgets" such as clocks, forms, and the like. Global median assets 622 can represent a repository of common graphical, sound, and other median assets such as logos, background art, icons, and the like for use in multiple screens.

In some embodiments, a multi-target development application can be used in conjunction with a unified code base. Unified code base drawer 624 can be used to maintain code segments or links to code segments for use in various and/or defining functional relationships between cells for use in automatically generating code for the various target platforms. For example, code segment assets (universal or otherwise) can be developed independently of the particular project managed via the hyper-wireframe and maintained in a code database or directory. The project may utilize "standard" components from the code base, such as a UI code asset for a slider bar, window, or other navigational element. The hyper-wireframe can include reference to the code asset, such as a URL (uniform resource locator) or other indicator of how to get the code asset when needed.

Documentation drawer 626 can be used to collect documentation for the project. The documentation may be associated with particular cells or may be organized in any other suitable manner.

Each master screen may provide a gateway for specifying derivative screens. For example, certain platforms may require a departure from the baseline application by using different artwork, different navigational components, and/or different code segments for handling functions provided via a master screen. These variants may be specified as derivative screens by including appropriate data in the hyper-wireframe data structure.

FIG. 6A also illustrates a "layers" menu 628. In this example, the "layers" menu is used to browse the different levels of organization for levels of the hyper-wireframe. In this example, top level tab 632 has been expanded to indicate an expandable tree 634 for each top level cell (home, featured, popular, favorites, and settings in this example). Each master screen menu can be expanded to view (or to define) a derivative screen. For example, the "Popular" master screen 610 may provide a table with a video preview window for popular videos to be displayed or browsed via the application being developed. The data rate for a particular target platform may be too low for a video preview, so the "Popular" folder could be expanded to specify a variant of the "popular" master screen for use on the mobile platform. For example, the mobile platform may feature a still image instead of a video preview or no preview window at all.

User interface 600 may provide multiple options for browsing or adding derivatives. Continuing with the mobile device example, the master profile may be expanded and a user may drill down to the "mobile device" portion of the tree to identify all derivatives for the mobile device.

FIG. 6B also illustrates user interface 600 with additional second level cells 611 and third level cells 613. Corresponding menu options 638 and 640 are shown at layers menu 628. Additionally, in this example, the master profile drawer has been expanded as shown at 618 to allow access (and/or editing) of the "global settings" along with profile settings for the platforms "mobile," "desktop," and "HDTV" targets. To the extent each target has specific sub-targets (e.g., specific mobile devices, desktop implementations, or HDTV types) the sub-targets may be viewed by expanding the respective target shown at 618.

Menu 612 appears in work area 604, but in this example the "link document" option has been selected. For instance, a developer may select a cell and then use the "link document" option to associate a document with the cell. The document may be imported into the project definition data and or a link for the document can be included in the project definition data. For example, a developer may link a specific art design or code segment with a particular cell. The multi-target development application may provide a dialog or wizard for a user to specify whether the linked document pertains to documentation, assets, or other categorizations of project components.

A hyper-wireframe in some embodiments supports expansion in the amount of information contained and organized by the wireframe. Specifically, the wireframe can be progressively built to greater levels of specificity during the development process. For example, initially, each master screen may simply be represented by artwork mockups. However, each cell can link to containers (such as drawers, nested layers, and menu trees, for example) to house or link to specific assets such as graphics, source code elements, documentation, and the like noted above. As the project develops, derivative screens can be specified and artwork and other assets adjusted accordingly. The hyper-wireframe data structure can provide a meaningful structure for maintaining the baseline application data, target-specific optimization parameters, and target-specific variants or derivatives of the baseline application that can be consumed by different applications for different purposes.

In some embodiments, a user may choose to 'deploy' a target package and, based on the hyper-wireframe, all of the files corresponding to assets for the target package can be assembled in one location, such as a single directory for the entire project. Some or all of the data from the hyper-wireframe itself may be included with the deployed data for reference purposes.

As another example, portions of the hyper-wireframe may be provided for use in generating reports, documentation, or to facilitate interaction with third-party developers. For example, the hyper-wireframe itself may be used to generate a wireframe such as depicted in FIG. 6 for explaining the project in a presentation to others. As another example, a read-only version of the hyper-wireframe can be provided to third-party developers for reference in completing an assigned portion of the project, with the hyper-wireframe administrator retaining the authority as to whether to include an asset provided by the third-party developers in the hyper-wireframe.

Figure 7:
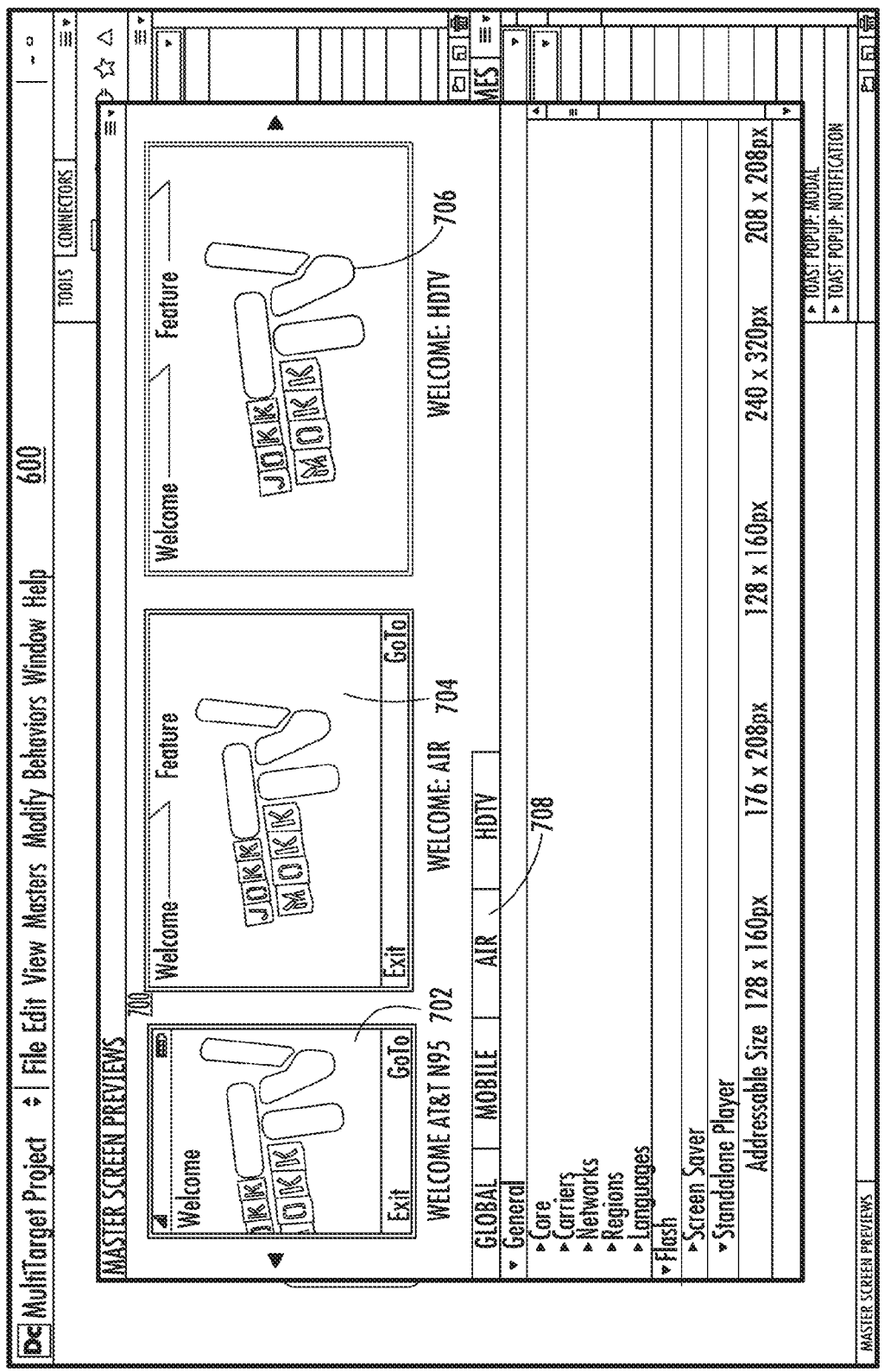
FIG. 7 illustrates a hyper-wireframe and associated implementation previews.

FIG. 7 illustrates user interface 600 with a master screen preview panel 700 enabled. In some embodiments, a multi-target development application can support user interface previews for the project based on the master profile data and other data defining the project. In this example, a preview screen 702 is shown for the mobile platform, a preview screen 704 is shown for the "AIR" implementation on a desktop platform, and a preview screen 706 is shown for the HDTV implementation. Preview window 700 further includes an information area 708 including tabs for a global overview of the target characteristics (here, the addressable resolution sizes are featured) and for each of the specific targets so that particular target characteristic values may be reviewed during the preview.

The different preview screens can use target profile information, such as frame rate, alpha transparency, resolution, etc. to simulate the appearance of an application and allow side-by-side comparisons. For example, as shown at 702 and 704, the "Exit" and "Go to" buttons are spaced farther apart in screen 704 and the welcome screen art is only partially visible in the "mobile" screen. Additionally, the "welcome" and "feature" tabs visible in screen 704 are not both visible in screen 702. This may indicate, for instance, that the implementation for the mobile platform requires some slight adjustment from the global application base. For example, a different tab size parameter and/or different size set of welcome screen artwork may need to be specified for the mobile platform.

Returning briefly to FIG. 1, computing platform 110 is connected to a display platform 111. For example, a particular computing platform may not have sufficient display capabilities to simulate output of an application. For instance, a computer may lack sufficient display size/resolution to properly provide HDTV output or aspect ratio. In some embodiments, a multi-target development application can be configured to interface with multiple displays and/or other computing devices to properly preview content. For example, rather than displaying HDTV content in a window 706 of tab 700, the HDTV-specific content can be previewed in a window on an HDTV-compliant device interfaced with the computer system.

Although FIG. 7 presents previewing in the context of a multi-target project defined using a hyper-wireframe data structure, the same principles could be applied in an embodiment in which a multi-target data structure is used without a hyper-wireframe.

Figure 8:
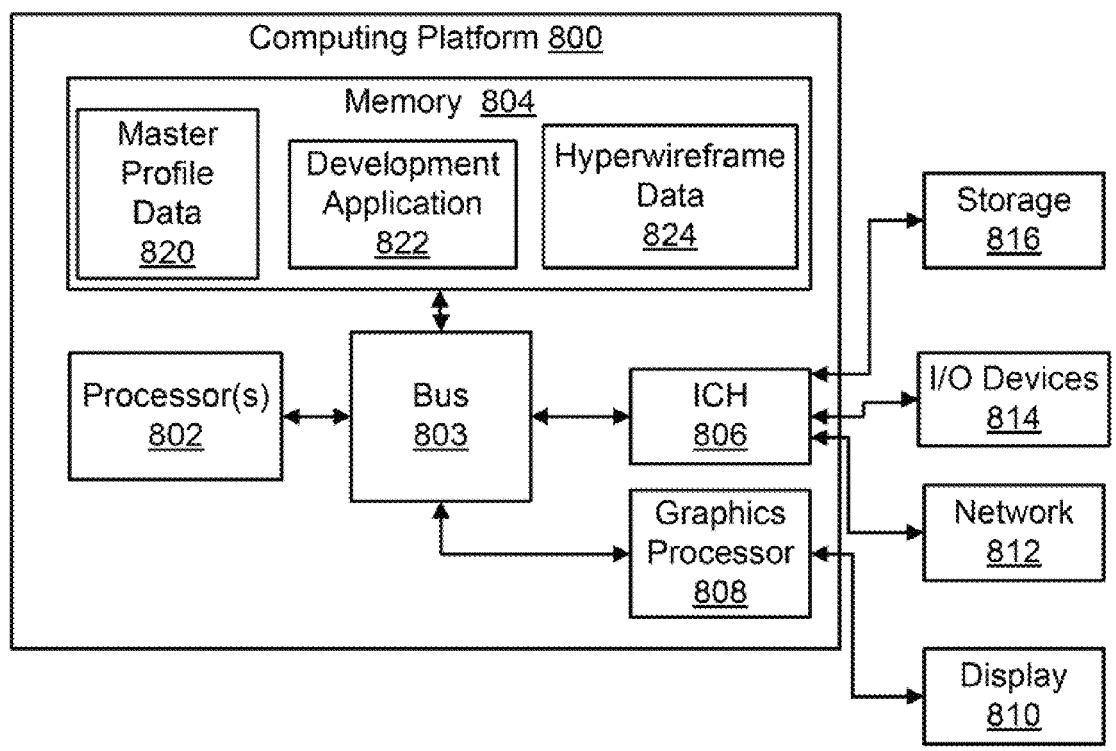
FIG. 8 illustrates an exemplary computing platform.

FIG. 8 illustrates an example of computing platform 800 suitable for implementing embodiments of the methods and systems as described in the examples above. The exemplary computing platform of FIG. 8 comprises: one or more processors 802; memory 804, representing one or more computer-readable media accessible by processor(s) 802 (e.g., processor cache, volatile memory such as DDR RAM, EDO RAM, etc, nonvolatile memory such as flash memory, etc.); an I/O control hub (ICH) 806; a graphics processor 808; and a bus 803. Graphics processor 808 is shown as connected to a display 810 of which different types exist such as Cathode Ray Tube (CRT), Thin Film Transistor (TFT), Liquid Crystal Display (LCD), DPL, etc. ICH 806 facilitates connection to various devices including a network interface component 812 (e.g., for connection to a local area network, wide area network, etc.); user I/O devices 814 (e.g., keyboard, touchpad, mouse, etc.); and storage 816 (e.g. a local or remote disk).

The one or more processors 802 execute instructions in order to perform whatever software routines the computing system implements. The instructions frequently involve some sort of operation performed upon data. Memory 804 is deliberately made available to other components within the computing platform. For example, the data received from various interfaces to the computing system (e.g., keyboard and mouse, printer port, LAN port, modem port, etc.) or retrieved from an internal storage element of the computing system (e.g., hard disk drive) are often temporarily queued into memory 804 prior to their being operated upon by the one or more processor(s) 802 in the implementation of a software program. Similarly, data that a software program determines should be sent from the computing system to an outside entity through one of the computing system interfaces, or stored into an internal storage element, is often temporarily queued in memory 804 prior to its being transmitted or stored.

The ICH 806 is responsible for ensuring that such data is properly passed between the memory 804 and its appropriate corresponding computing system interface (and internal storage device if the computing system is so designed).

FIG. 8 further illustrates master profile data 820, development application 822, and hyper-wireframe data 824. For example, development application 822 may access master project data and maintain a representation of the hyper-wireframe and master profile in memory and use the data to provide a user interface for accessing and editing remaining portions of the project. Memory 804 may include additional components such as an operating system to coordinate operation of the computing platform and other applications used for the project such as a developer application for generating source code and/or a design application for creating and editing artwork.

Figure 9:
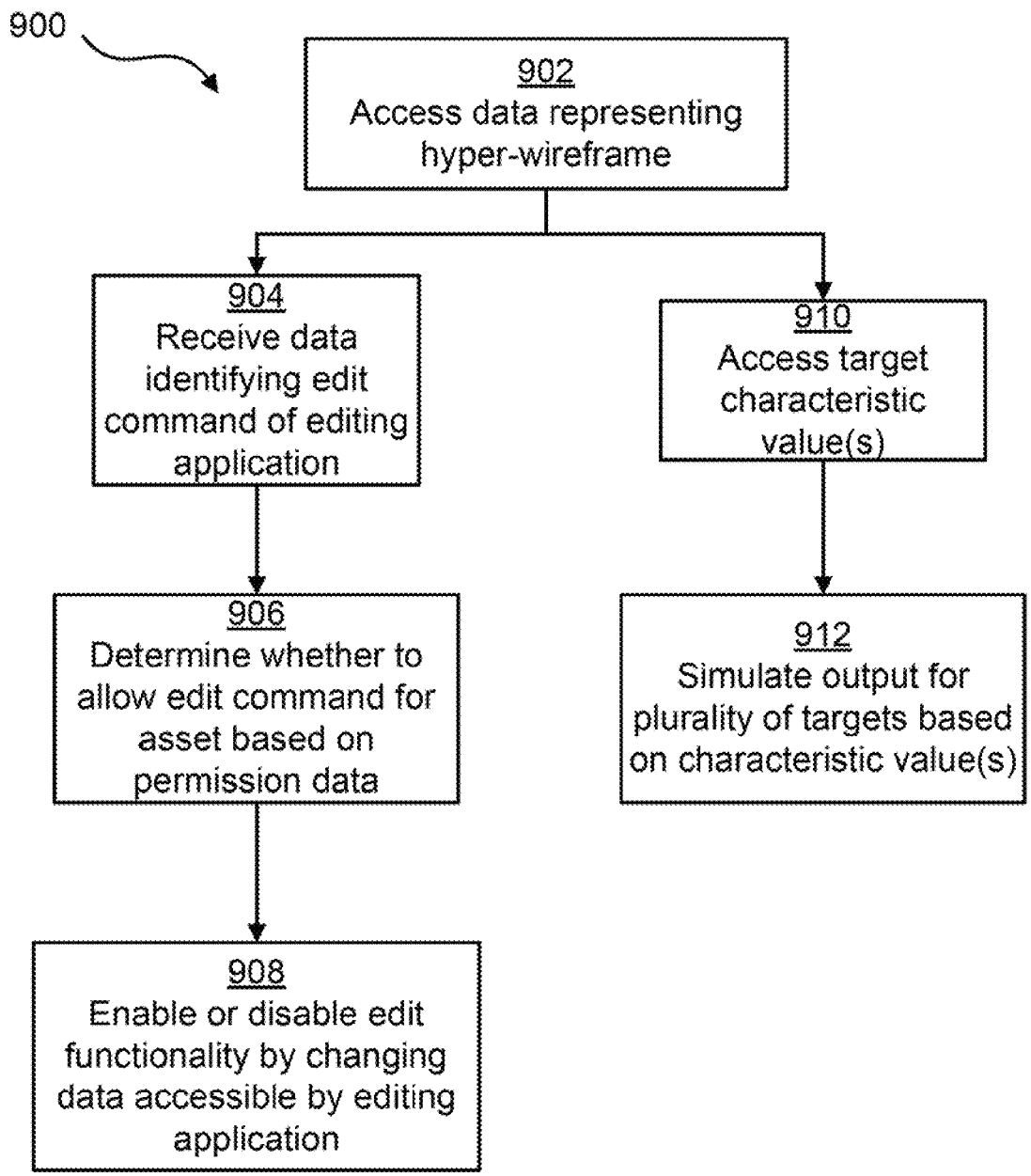
FIG. 9 illustrates an exemplary method for using a hyper-wireframe.

FIG. 9 is a flowchart illustrating an exemplary computer-implemented method 900 for using a hyper-wireframe data structure or another data structure configured in accordance with aspects of the present subject matter. At block 902, data in a computer-readable medium and representing a hyper-wireframe data structure is accessed. As noted above, the hyper-wireframe data structure can identify a plurality of assets of a multi-target development project, a target characteristic value for a plurality of targets of the multi-target development project, and developer permission for the assets. Two exemplary branches are shown in method 900.

A first branch begins at block 904, which represents receiving data identifying a command to edit an asset using an editing application, the command identifying a developer.

For example, the command to edit the asset may identify an artwork fragment for editing via a design application or code segment portion for editing via a development application. As another example, the command may identify a plurality of assets for simultaneous editing via a design or development application. As a further example, the command may identify a plurality of assets for editing via a command to edit the hyper-wireframe itself using an embodiment of the multi-target development application that allows for a user to define and edit hyper-wireframe data. Although an edit command is used in this example for an operation editing the hyper-wireframe data, the edit command could comprise a request to simply access one or more assets for viewing only.

Block 906 represents determining whether to allow the edit command based on the developer permission. For example, access to certain asset(s) may be completely disallowed for certain users. As another example, only certain types of viewing or editing may be allowed. For instance, editing of certain assets via a design application may be allowed for design personnel, but not for developers who write code for the project. Similarly, editing of assets via a development application may be allowed for the developers but not the design personnel. As an example, all personnel except the project manager may be precluded from editing the hyper-wireframe but may be allowed to view the overall project files.

Block 908 represents enabling or disabling functionality corresponding to the edit command by changing data stored at a memory location accessible by the editing application. For example, flags or other memory components consulted by the editing application may be changed to reconfigure the available functionality of the editing application. As another example, the application evaluating the permission data may send one or more commands or messages to the editing application indicating which (if any) features to enable or disable.

Block 906 may additionally or alternatively allow or deny the edit command based on accessing a target characteristic value. For example, as was noted above, certain target platforms may have different graphic capabilities. For instance, the master profile for a project may include a target characteristic value to indicate that gradients are unavailable for the project. At block 908, the editing functionality of a design application may be adjusted to disable gradients to avoid an art design that is incompatible with the master profile.

In this example, blocks 906 and 908 are shown as responsive to a particular editing command. In some embodiments, when an asset is accessed using an editing application, all available functionality of the editing application is tested against the permission data and/or target characteristic value(s). For instance, if an asset is opened in a design application, the hyper-wireframe seed application or component can evaluate the feature set of the design application against the permissions/target characteristic values and provide appropriate commands to enable or disable the design application functionality in accordance with the permissions and target characteristic values.

Blocks 910 and 912 represent a second branch of method 900 that may be carried out in addition to or instead of blocks 904-908. For example, blocks 910 and 912 may be carried out when an asset is accessed via an editing application. At block 910, one or more target characteristic values are accessed and at block 912 the target characteristic values are used to simulate output for a plurality of targets of the project. For example, graphic constraints such as gradient availability, number of colors, and frame rate may be used to provide a side-by-side comparison of video components for different targets. Block 912 may comprise providing output to one or more suitable output devices, including determining if a particular output device is required based on the target characteristic value. For example, if the target characteristic value indicates HDTV-quality resolution, block 912 can include determining if a display with HDTV-quality resolution is available and routing output to the display.

Method 900 may additionally comprise providing an interface for editing the hyper-wireframe. For example, an interface as discussed in FIGS. 5-7 above may be provided so that hyper-wireframe data can be specified by way of menus, dialogs, and drag-and-drop functionality. Permission and/or target data may be used to restrict the addition or editing of the overall project structure. For example, only a project manager may be allowed to set permissions for other users and edit/define Some portions of the detailed description are presented in terms of algorithms, discussions, or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied-for example, blocks can be re-ordered, combined, and or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A computer-implemented method for managing a plurality of device-specific implementations for an application being developed, comprising:
receiving input establishing the plurality of device-specific implementations, each device-specific implementation corresponding to at least one target platform and at least one target device from amongst a plurality of available platforms and a plurality of available devices;
creating, based on the received input, a hyper-wireframe data structure, the hyper-wireframe data structure providing an architecture for the application including a plurality of cells and a navigational relationship between the plurality of cells, wherein each cell represents an individual state of the application being developed, and wherein each cell is associated with one or more device-specific implementations of the plurality of device-specific implementations;
receiving an association identifying a relationship between an asset and a cell of the plurality of cells, the asset having an asset type, the asset used in at least one of the one or more device-specific implementations associated with the cell; and
storing, in a computer-readable medium, the hyper-wireframe data structure identifying the plurality of cells, the navigational relationship between the cells, the association, and the asset.

2. The method set forth in claim 1, further comprising:
receiving a command to edit the asset using an editing application, the command identifying a user;
determining a user role associated with the user;
determining whether to enable or disable an editing feature of the editing application based on the asset type associated with the asset and the determined user role; and
based on the determination of whether to enable or disable the editing feature, enabling or disabling use of the editing feature of the editing application.

3. The method set forth in claim 1, further comprising:
receiving master profile information defining a master profile that identifies an implementation characteristic value for the device-specific implementation; and
including the implementation characteristic value in the hyper-wireframe data structure.

4. The method set forth in claim 3, wherein the implementation characteristic value comprises a value indicating at least one of a frame rate, an alpha transparency, a network latency, pixel density, pixel ratio, and audio availability for the target.

5. The method set forth in claim 3, further comprising providing an interface for selecting the plurality of device-specific implementations, each device-specific implementation being associated with a device, device model, communication network, or execution environment.

6. The method set forth in claim 5, wherein the implementation characteristic value included in the data structure is determined by:
accessing a profile associated with the selected device-specific implementations, the profile of a selected device-specific implementation identifying a value of one or more implementation characteristics of the selected device-specific implementation; and
identifying a lowest common denominator of the plurality of device-specific implementations based on the one or more implementation characteristics across the accessed profiles,
wherein the implementation characteristic value included in the data structure comprises the identified lowest common denominator.

7. The method set forth in claim 6, wherein a plurality of implementation characteristic values are included in the data structure, at least one of the values determined by:
accessing data identifying a prioritized one of the plurality of selected device-specific implementations; and
using at least one implementation characteristic value from the profile for the prioritized selected device-specific implementations rather than the lowest common denominator for the one or more implementation characteristic across the accessed profiles.

8. The method set forth in claim 5, wherein a plurality of values are included in the hyper-wireframe data structure for a same implementation characteristic.

9. The method set forth in claim 5, further comprising providing output simulating output for the plurality of device-specific implementations based on the implementation characteristic value.

10. The method set forth in claim 3, further comprising:
receiving a command to edit the asset using an editing application;
determining whether to enable or disable an editing feature of the editing application based on the asset and the implementation characteristic value; and
providing a command to the editing application to adjust output of the editing application based on the implementation characteristic value.

11. The method set forth in claim 1, further comprising: receiving input defining permissions, wherein the permissions prevent users of a first user role from editing assets of a first asset type but allow users of the first user role to edit assets of a second asset type, and wherein the permissions further prevent users of a second user role from editing assets of the second asset type but allow users of the second user role to edit assets of the first asset type.

12. The method set forth in claim 11, wherein the first user role is a developer, wherein, according to the permissions, users that are developers are prevented from editing artwork but allowed to edit code.

13. The method set forth in claim 11, wherein the first user role is a designer wherein, according to the permissions, users that are designers are prevented from editing code but allowed to edit artwork.

14. The method set forth in claim 11, wherein the first user role is a developer and a second user role is a designer, wherein, according to the permissions:
users that are developers are prevented from editing artwork but allowed to edit code; and
users that are designers are prevented from editing code but allowed to edit artwork.

15. The method set forth in claim 11, wherein the permissions further prevent or allow editing of the hyper-wireframe data structure by a user based on the user's corresponding user role.

16. The method set forth in claim 11, wherein the permissions further prevent or allow users to edit assets based on the specific implementation associated with the asset.

17. The method set forth in claim 1, further comprising simultaneously providing one or more device-specific implementations of the plurality of device-specific implementations associated with the application, wherein simultaneously providing the one or more device-specific implementations provides a visual comparison of the one or more device-specific implementations, each of the one or more device-specific implementations corresponding to a different target device.

18. The method set forth in claim 1, further comprising simultaneously providing for display one or more of the plurality of device-specific implementations in light of capabilities of the device with which each of the one or more of the plurality of device-specific implementations is associated.

19. The method set forth in claim 1, further comprising simultaneously providing for display one or more of the plurality of device-specific implementations in light of capabilities of the device with which each of the one or more of the plurality of device-specific implementations is associated, wherein the device capabilities include at least one of memory, cpu, network, frame-rate, graphics display, and input method.

20. The computer-implemented method of claim 1, wherein the asset includes an annotation, test information, or a segment of code.

21. The computer-implemented method of claim 1, further comprising simultanesouly generating multiple applications for multiple devices having respective multiple platforms using the hyper-wireframe data structure.

22. A non-transitory computer-readable medium tangibly embodying program code executable by a processor, the program code comprising:
   program code for receiving input establishing a plurality of device-specific implementations of an application under development, each device-specific implementation corresponding to at least one target platform and at least one target device from amongst a plurality of available platforms and a plurality of available devices;
   program code for creating, based on the received input, a hyper-wireframe data structure, the hyper-wireframe data structure providing an architecture for the application including a plurality of cells and a navigational relationship between the plurality of cells, wherein each cell represents an individual state of the application being developed, and wherein each cell is associated with one or more device-specific implementations of the plurality of device-specific implementations;
   program code for receiving an association identifying a relationship between an asset and a cell of the plurality of cells, the asset having an asset type, the asset used in at least one of the one or more device-specific implementations associated with the cell; and
   program code for storing, in a computer-readable medium, the hyper-wireframe data structure identifying the plurality of cells, the logical navigational relationship between the cells, the association, and the asset.

23. The non-transitory computer-readable medium set forth in claim 22, wherein the application under development is intended as a multi-target project and the data structure further comprises a target characteristic value for a target of the multi-target project; and
   wherein determining is further based on the target characteristic value.

24. The non-transitory computer-readable medium set forth in claim 23, further comprising program code for determining the target characteristic value by:
   accessing a profile associated with each of a plurality of selected targets, the profile of a target identifying a value of one or more characteristics for the target; and
   identifying a lowest common denominator for each of the target characteristics across the accessed profiles,
   wherein the target characteristic value included in the data structure comprises the identified lowest common denominator.

25. The non-transitory computer-readable medium set forth in claim 24, wherein a plurality of target characteristic values are included in the data structure, at least one of the values determined by:
   accessing data identifying a prioritized one of the plurality of selected target platforms; and
   using at least one target characteristic value from the profile for the prioritized selected target platform rather than the lowest common denominator for that target characteristic across the accessed profiles.

26. The non-transitory computer-readable medium set forth in claim 23, further comprising:
   program code for providing a command to the editing application to simulate output for a target based on the target characteristic value.

27. The non-transitory computer-readable medium set forth in claim 24, wherein the target characteristic value comprises a value indicating at least one of a frame rate, an alpha transparency, a network latency, pixel density, pixel ratio, and audio availability for the target.

28. The non-transitory computer-readable medium set forth in claim 22, further comprising:
   program code for receiving input defining a plurality of cells, each cell representing a master screen of the application under development; and
   program code for associating the assets with one or more cells and including data representing the plurality of cells and association of the asset in the data structure.

* * * * *